April 18, 1967 P. K. H. KRAUSE ETAL 3,314,525
TRANSLOADING DEVICE
Filed March 1, 1965 3 Sheets-Sheet 1

Inventors:
Peter Karl Herbert Krause
Alexander Langner

Inventors:
Peter Karl Herbert Krause
Alexander Langner

United States Patent Office 3,314,525
Patented Apr. 18, 1967

3,314,525
TRANSLOADING DEVICE
Peter Karl Herbert Krause and Alexander Langner, both of Rheinhausen, Germany, assignors to Beteiligungs- und Patentverwaltungsgesellschaft mit beschrankter Haftung, Essen, Germany
Filed Mar. 1, 1965, Ser. No. 435,837
Claims priority, application Germany, Feb. 28, 1964, B 75,645
3 Claims. (Cl. 198—36)

The present invention relates to a transloading device adapted to unload material from a first place onto a storage place and for picking up the material from said storage place and transferring it back to said first place. Such a device has a boom which is tiltable in a vertical plane and is supported by an upper frame structure rotatable about a vertical axis. A device of this type furthermore comprises pick-up means, for instance a bucket wheel, and also comprises a reversible first conveyor or boom belt as well as a second conveyor or storage place conveyor belt arranged below the said upper frame structure of the device and resting on the storage place. The upper section of said second conveyor belt extends to a belt loop-discharge drum in such a way that when unloading material onto the storage place, the material discharged from the belt loop-discharge drum will around the turning axis of the upper frame structure pass through a chute supported by said upper frame structure onto the boom belt.

With heretofore known devices of the type involved, the reversing drum at the inner end of the boom belt is offset with regard to the vertical turning axis of the upper frame structure in such a way that when operating the boom belt in a direction for picking up material from the storage place and unloading the same onto the second or storage place conveyor belt, the flow of material from the boom belt will enter a chute arranged coaxially with regard to the vertical turning axis of the upper frame structure and will do so regardless of the angle of the boom. From the said chute the material then drops onto said second or storage place conveyor belt.

On the other hand, the discharge drum of the belt loop must be so arranged that the material coming therefrom will with all lateral turning movements of the upper frame structure drop into a successive chute arranged substantially coaxially with regard to the vertical turning axis of the upper frame structure. Inasmuch as therefore due to the offset of the reversing drum of the boom belt the material dropping out of the chute would not or only partly reach the second belt, it becomes necessary to pass the material discharged from the belt loop to the inner end of the boom belt by means of a short intermediate belt. This, however, requires additional structural elements, particularly inasmuch as the said intermediate belt has to take part not only in the lateral turning movements of the upper frame structure but also in the tilting movements of the boom. Moreover, a special drive for such intermediate belt is necessary. In addition thereto, the said intermediate belt, due to the additional transfer station, requires a correspondingly high location of the belt loop discharge drum which in its turn has an unfavorable effect upon the length of the belt loop boom.

Instead of an intermediate belt, another heretofore known arrangement employs a chute which in order to be able to adapt itself to the height of the boom is composed of two interlinked parts. Also this construction is rather expensive and due to the required slight angle of the chute has a considerable extension in the direction of height of the device. This requires an undesired raising or elevation of the belt loop discharge drum.

According to another heretofore known transloading device, the inner end of the boom belt extends over the vertical tilting axis of the upper frame structure so that when operating the second or storage place conveyor belt, the material discharged from the belt loop can drop without difficulties onto the boom belt. This arrangement, however, is rather unfavorable when the device is operated for picking up material from the storage place and conveying it to another place. The disadvantage of this type during the last mentioned operation is due to the fact that the discharge flow from the reversing drum at the inner end of the boom has to be diverted by means of a complicated chute construction toward the vertical turning axis of the upper frame structure.

The above mentioned heretofore known transloading devices also have the additional drawback that a feeding of the material onto the second conveyor belt past the pile of transported material is not possible at all or only when the lower frame structure is provided with such a high gate-shaped construction that the belt loop carrier after having been lowered accordingly can pass below the device. This is highly disadvantageous inasmuch as in such instances the device has to be designed unduly high and the belt loop carrier has to be correspondingly long.

According to still another heretofore known transloading device of the type involved, the upper section of the second or storage place conveyor belt is not directly passed upwardly in a long loop to a discharge drum near the vertical turning axis of the upper frame structure. Instead the material is conveyed upwardly into the neighborhood of the vertical turning axis of the device by a combination of a belt loop carriage with a short boom and an intermediate conveyor belt which rests on the lower frame structure.

For purposes of picking up material from the storage place and loading it onto the storage place conveyor belt, it is necessary to adjust the reversing drum at the inner end of the boom belt. The transfer of material onto the storage place conveyor belt past the pile of deposited material is with this arrangement made possible only by withdrawing the belt loop carriage from the intermediate conveyor and by disconnecting the belt loop by means of a special design of the belt loop carriage. While in this way a loading in both directions will be made possible, an arrangement of this type requires considerable additional structural elements, therefore is rather expensive and in addition thereto brings about that the device becomes rather long which is frequently of great disadvantage, particularly when a limited space only is available.

It is, therefore, an object of the present invention to provide a transloading device which will overcome the above mentioned drawbacks.

It is another object of this invention to provide a transloading device of the above mentioned general character, which can easily be converted so as selectively to load material onto a storage place or to pick up material from a storage place and conveying it to another place.

These and other objects and advantages of the invention will appear more clearly from the following specification in connection with the accompanying drawing, in which:

FIG. 1 diagrammatically illustrates a transloading device according to the present invention in condition for unloading material onto a storage place.

Figure 1:
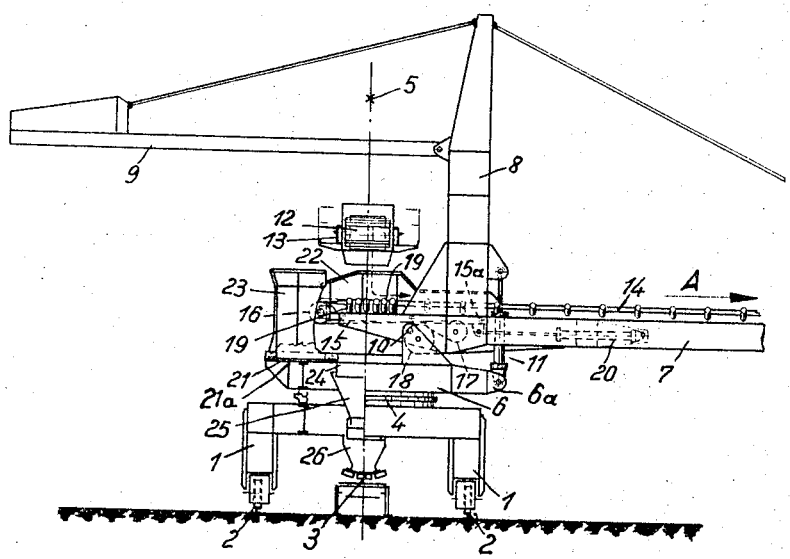

The transloading device according to the present invention is characterized primarily by a feeding head including one of the reversing drums of the boom belt and a loop drum of the boom belt, said feeding head being displaceable relative to the tiltable boom of the transloading device. The present invention is furthermore characterized by a two-way chute displaceable in the upper frame structure of the device independently of the tilting position of the boom. The said two-way chute is so adjustable that the material discharged from the belt loop which when loading material onto the storage place passes through one part of the two-way chute, will for purposes of charging the storage place conveyor belt pass through the other part of the chute past the reversing drum of the boom belt. Advantageously, a bin or the like device precedes the storage place conveyor belt in the path of the material to the latter so that the material will not hit the storage place conveyor belt with full force.

Referring now to the drawing in detail, the transloading device shown therein comprises a gate-shaped lower frame structure or understructure 1 which is movable on rails 2 at opposite sides of a conveyor belt 3 henceforth called storage place conveyor belt. Understructure 1 is thus movable above the said storage place conveyor belt 3. The transloading device according to the invention furthermore comprises an upper structure supported by the understructure by means of a turntable 4 so that the upper structure is turnable about a vertical axis 5. The upper structure comprises a platform 6 and a rocker including a boom 7, a column 8 fixedly conected to boom 7 and a counter boom 9 connected to the upper portion of column 8. The said rocker 7, 8, 9 rests on platform 6 in a rocker bearing 10 the axis of which is offset with regard to the vertical axis 5 in the direction toward the outer end of boom 7. On the other hand, said rocker 7, 8, 9 rests by a hydraulic lifting device 11 connected to column 8 on an extension 6a on platform 6.

The upper section of storage place conveyor belt 3 is by means of a loop belt carriage known per se and connected to the understructure 1 passed in a loop to a discharge drum 12. Drum 12 is arranged at the end of a boom 13 of the belt loop carriage in such a way that the discharge flow of material from said discharge drum 12 drops into the respective chute part on the frame upper structure in the neighborhood of the vertical turning axis 5.

Boom 7 carries a reversible conveyor belt 14 which, when driven so as to move in the direction of the arrow A, discharges material loaded onto conveyor belt 14 to a bucket wheel past the tip of boom 7 whereupon the material is discharged from the bucket wheel onto the storage place. When conveyor belt 14 is driven so as to move in the direction of the arrow B (FIG. 2) material picked up by the bucket wheel from the storage place and loaded onto conveyor belt 14 passes around the vertical axis 5 onto storage place conveyor belt 3.

In order easily to shift from operation of the conveyor belt 14 in one direction to an operation in the opposite direction, boom 7 has at that end thereof which is adjacent axis 5 arranged a feeding head comprising a frame 15. Frame 15 is by means of rollers 15a displaceable on rails or the like on boom 7 in longitudinal direction thereof. One end of frame 15 carries a reversing drum 16 for belt 14, while near the other end of frame 15 at the bottom side thereof there is arranged a loop drum 17. The lower section of belt 14 passes from loop drum 17 back around a drum 18 journalled on boom 7 near the pivot shaft 10 for rocker 7, 8, 9. Frame 15 has charging rollers 19 journalled thereon shortly in front of reversing drum 16 for supporting the upper section of belt 14. A hydraulically operable cylinder piston system 20 supported by boom 7 is operatively connected to frame 15 for selectively displacing the same.

Platform 6 has arranged thereon rails 21 extending in the longitudinal direction of boom 7, on which rails the two-way chute 22, 23 is displaceable. The said chute comprises two parts of which part 22 is so designed that it conveys the material discharged by belt loop drum 12 onto the inner end of boom belt 14 (FIG. 1) when the feeding head 15 occupies the position shown in FIG. 1. The material will then be conveyed by belt 14 in the direction of the arrow A and through the above mentioned bucket wheel is unloaded onto the storage place. Chute part 22 is so designed that it will be able to convey the material to belt 14 in all tilted positions of boom 7.

Figure 2:
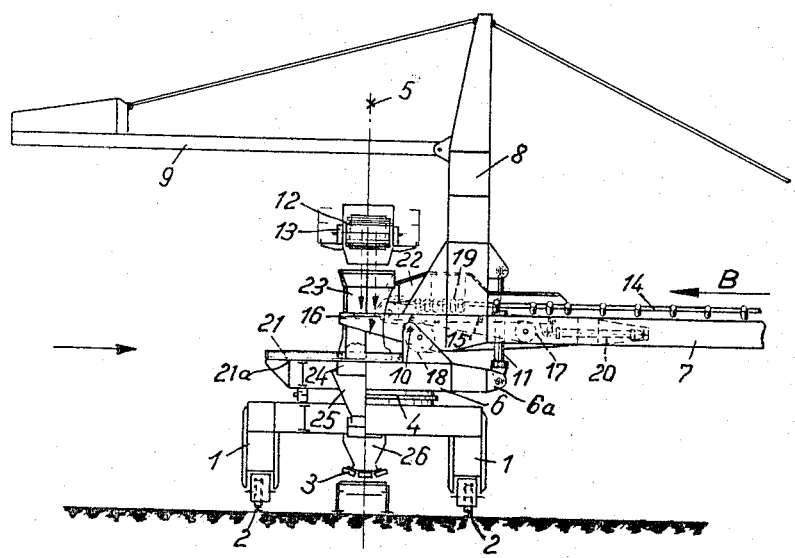
FIG. 2 is a view similar to that of FIG. 1 but showing the transloading device while picking up material from the storage place and loading it onto a conveyor belt for conveying the material to another place.
Figure 3:
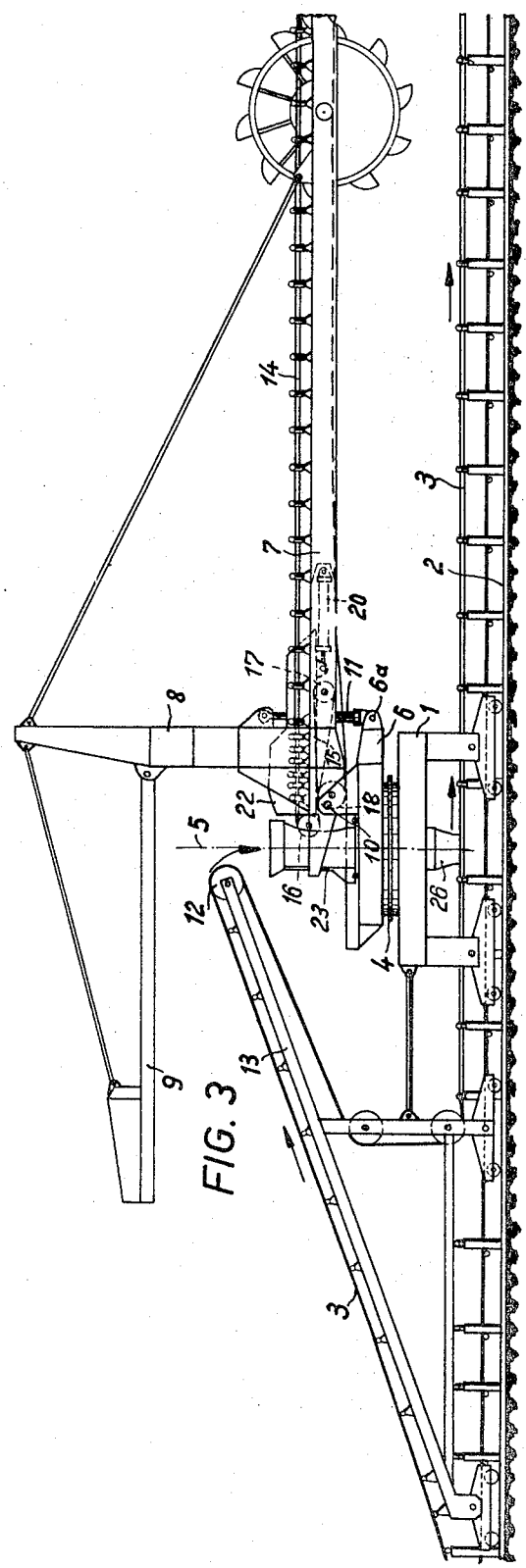
FIG. 3 shows the device according to FIGS. 1 and 2 in a view in the direction of the arrow C in FIG. 2, the upper structure being slewed about 90°.
Figure 4:
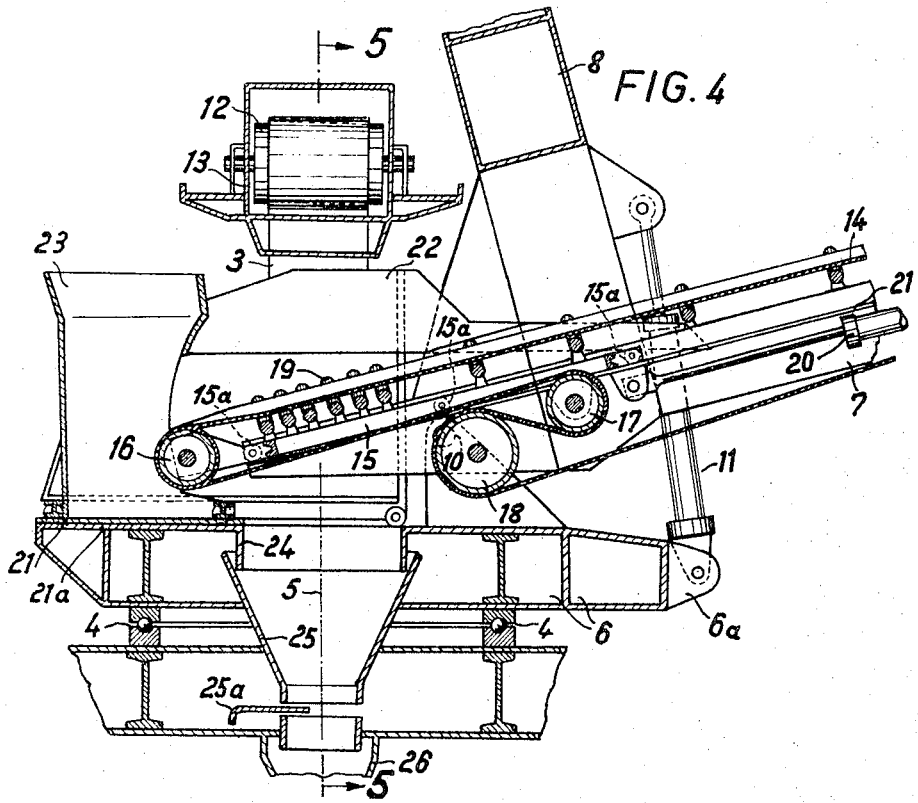
FIG. 4 illustrates on a larger scale than that of FIG. 3 a vertical section through the central portion of the device according to FIG. 1, the boom being somewhat raised.
Figure 5:
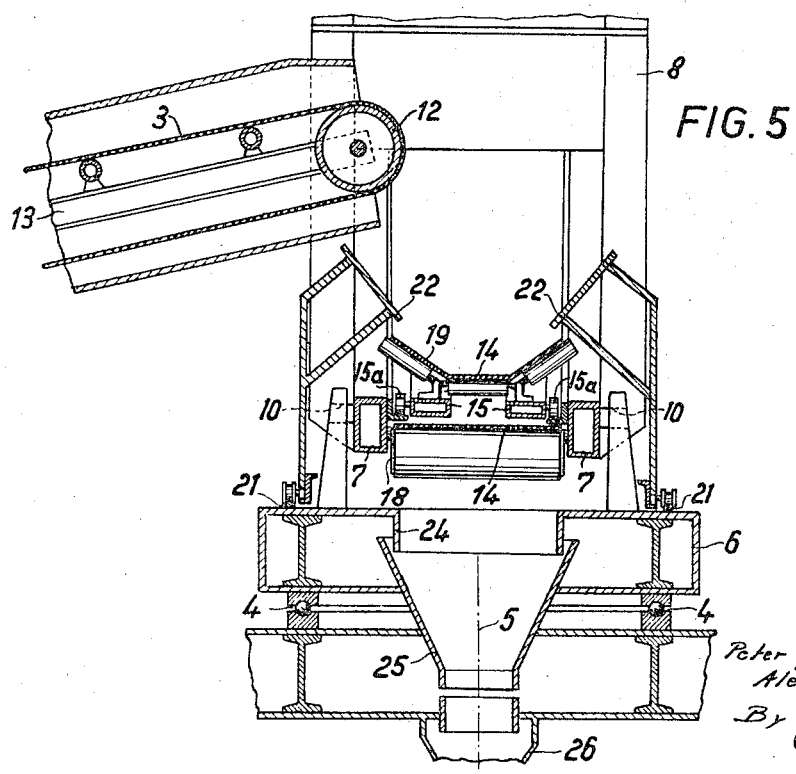
FIG. 5 is a section along line V—V in FIG. 4.

The other part 23 of the two-way chute 22, 23 is so designed that when it occupies the position shown in FIG. 2, i.e. when the feeding head 15 has been moved completely toward the inner end of boom 7, the material discharged by belt loop reversing drum 12 will pass by the reversing drum 16 of belt 14 and between the rear side sections of boom 7. The material then passes through chute part 23 through a cylinder 24 arranged in platform 6 and coaxial with axis 5 into a bin or hopper 25 on the frame understructure 1. From here the material passes through an adjustable withdrawing device 25a (FIG. 4) into a chute 26 on understructure 1 and from there onto storage place conveyor belt 3.

It will be evident from the above, that in this way the material can be passed onto conveyor belt 3 past the pile of poured material without the necessity of detaching the belt loop carriage from the understructure 1 or by effecting other awkward adjustments of the belt loop carriage.

As will be evident from FIG. 2, simultaneously with the conveying of material onto conveyor belt 3 from reversing drum 12, it is also possible to pick up material from the storage place and likewise to unload said material onto conveyor belt 3 by running the boom belt in the direction of the arrow B. In this manner, a desired intermixture of different types of pourable material can be effected.

With regard to bin 25, it may be mentioned that the purpose of the latter is to prevent the material passing through chute part 23 from hitting the storage place belt 3 at full force. In this way, belt 3 will be saved. Bin 25 furthermore acts as a kind of combined buffer storage means so that in case the material is non-uniformly fed during a pickup operation over belt 14, conveyor belt 3 will be nevertheless substantially uniformly charged.

When two-way chute 22, 23 occupies its FIG. 1 position, chute part 23 occupies a position above a cover plate 21a of platform 6 so that the discharge opening of chute part 23 is closed and any material which should accidentally enter chute part 23 cannot be discharged.

It is, of course, to be understood that the present invention is, by no means, limited to the particular arrangement shown in the drawing but also comprises any modifications within the scope of the appended claims.

What we claim is:

1. In combination in a transloading arrangement: a lower frame structure, an upper frame structure supported by said lower frame structure and rotatable about a vertical axis, a boom supported by said upper structure and tiltable in a vertical plane, first conveyor means supported by said boom and including first endless conveyor belt means and also including a feeding head comprising a first reversing drum passed over by said first belt means and also comprising a loop drum likewise passed over by said first belt means, second conveyor means including a second reversing drum located at a level higher than the level of said first reversing drum, said second conveyor means also including second endless conveyor belt means having a portion of its upper section extending below said lower frame structure and having another portion passing over said second reversing drum for dumping material thereover, said feeding head being displaceable relative to said boom from a rearward position in the dumping path of said second reversing drum to a forward position substantially out of said dumping path and vice versa, and chute means supported by said upper frame structure and movable relative thereto selectively into a first position and into a second position, said chute means including a first conveying section adapted in said first position of said chute means to receive material from that respective portion of said second belt means which is passing over said second reversing drum whereby said first conveying section in said first position of said chute means is adapted to convey material received from said second belt means over said second reversing drum onto the respective portion of said first belt means which passes over said feeding head while the latter is in its rearward position, said chute means also including a second conveying section movable into the drop path of said second reversing drum in response to said chute means moving into its second position whereby while said feeding head is in its forward position material dropped from the respective portion of said second conveyor belt means passing over said second reversing drum is conveyed onto that portion of said second conveyor belt means which is below said lower frame structure.

2. An arrangement according to claim 1, which includes bin means arranged in said lower frame structure in coaxial relationship to said vertical axis and having a discharge opening above that portion of said second conveying belt means which is below said lower frame structure, said bin means being adapted to receive material dropped from the respective portion of said second belt means on said feeding head in the forward position of the latter while said chute means is in its second position.

3. An arrangement according to claim 2, which includes means associated with said bin means and operable selectively to vary the effective discharge opening of said bin means relative to said second conveyor belt means below said lower frame structure.

References Cited by the Examiner
UNITED STATES PATENTS

| | | | |
|---|---|---|---|
| 1,055,926 | 3/1913 | Leask | 198—139 X |
| 1,310,454 | 7/1919 | Stuart | 198—36 |
| 1,706,203 | 3/1929 | Allen | 198—49 X |

OTHER REFERENCES

German printed application P 10,651, June 1956.

EVON C. BLUNK, *Primary Examiner.*

R. J. HICKEY, *Assistant Examiner.*